(12) United States Patent
Sharma et al.

(10) Patent No.: US 10,511,722 B2
(45) Date of Patent: Dec. 17, 2019

(54) ONLINE CHARGING FOR APPLICATION DOWNLOAD

(71) Applicant: TELEFONAKTIEBOLAGET LM ERICSSON (PUBL), Stockholm (SE)

(72) Inventors: Nipun Sharma, New Delhi (IN); George Foti, Dollard des Ormeaux (CA); Lila Madour, Kirkland (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/324,016

(22) PCT Filed: Aug. 18, 2016

(86) PCT No.: PCT/IB2016/054958
§ 371 (c)(1),
(2) Date: Feb. 7, 2019

(87) PCT Pub. No.: WO2018/033777
PCT Pub. Date: Feb. 22, 2018

(65) Prior Publication Data
US 2019/0182386 A1    Jun. 13, 2019

(51) Int. Cl.
*H04M 15/00* (2006.01)
*H04L 12/14* (2006.01)
*H04W 4/24* (2018.01)

(52) U.S. Cl.
CPC .......... *H04M 15/66* (2013.01); *H04L 12/141* (2013.01); *H04L 12/1407* (2013.01);
(Continued)

(58) Field of Classification Search
CPC ... H04M 15/66; H04L 12/1407; H04L 12/141
(Continued)

(56) References Cited

U.S. PATENT DOCUMENTS

| 8,737,956 B2 | 5/2014 | Stenfelt et al. |
| 2008/0182559 A1* | 7/2008 | Pyhalammi ............. H04L 12/14 455/412.1 |

(Continued)

FOREIGN PATENT DOCUMENTS

| WO | 02/44892 A2 | 6/2002 |
| WO | 2015/097553 A2 | 7/2015 |

OTHER PUBLICATIONS

3GPP TS 32.251 V13.4.0, 3rd Generation Partnership Project; Technical Specification Group Services and System Aspects; Telecommunication management; Charging management; Packet Switched (PS) domain charging (Release 13), Mar. 2016, pp. 1-180.
(Continued)

*Primary Examiner* — Nghi H Ly

(57) ABSTRACT

This specification presents methods and apparatus in a user equipment, packet data gateway, online charging server and policy server for enabling a user equipment with a prepaid subscription to select an application to download and obtain its downloadable size and reserve charging credits and resources at the network prior to downloading the application in accordance with the downloadable size thus allowing the prepaid user to secure the successful entire download of the application without running the risk of depleting the prepaid account while downloading.

7 Claims, 9 Drawing Sheets

(52) U.S. Cl.
CPC ........ *H04L 12/1435* (2013.01); *H04M 15/80* (2013.01); *H04W 4/24* (2013.01)

(58) Field of Classification Search
USPC .......... 455/406, 405, 412.1, 414.1, 418, 410
See application file for complete search history.

(56) References Cited

U.S. PATENT DOCUMENTS

| | | | |
|---|---|---|---|
| 2012/0184258 A1* | 7/2012 | Kovvali | H04W 4/18 455/418 |
| 2012/0320801 A1 | 12/2012 | Yang et al. | |
| 2013/0210404 A1* | 8/2013 | Curtis | H04L 67/34 455/418 |

OTHER PUBLICATIONS

3GPP TS 29.212 V12.12.0, 3rd Generation Partnership Project; Technical Specification Group Core Network and Terminals; Policy and Charging Control (PCC); Reference points (Release 12), Mar. 2016, pp. 1-222.

3GPP TS 23.401 V13.6.1, 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2016, pp. 1-365.

ISR and Written opinion from corresponding application PCT/IB2016/054958.

* cited by examiner

ONLINE CHARGING FOR APPLICATION DOWNLOAD

TECHNICAL FIELD

This disclosure relates generally to online charging of subscribers for packet data services in a telecommunication network.

BACKGROUND

Telecommunications networks such as third generation partnership, 3GPP, networks provide functions that implement online charging. Online charging is a process where charging information for network resource usage is collected concurrently with that resource usage. However, authorization for the network resource usage must be obtained by the network prior to the actual resource usage to occur. This authorization is granted by the Online Charging Server, OCS, upon request from the network. More specifically, a subscriber account located in the 3GPP OCS is queried prior to granting permission to use the requested network resource (s). In other words, online charging is a mechanism where charging information can affect, in real-time, the service rendered to the user/subscriber.

3GPP has standardized an OCS specified in 3GPP technical specification TS 32.296. FIG. 1 (Prior art) illustrates a simplified architecture of the 3GPP OCS providing online charging for services provided by the Evolved Packet System, EPS, as specified in 3GPP TS 23.203 and 3GPP 23.401.

The network entities, NE, of the EPS such as the packet data gateway, PGW, illustrated in FIG. 1 (prior art) and optionally the policy control and charging function, PCRF, furnish charging information to the OCS in order to perform Credit-Control before the network resource usage is permitted. To support online charging for services provided to a subscriber, a prepaid subscriber account has to exist in the OCS, against which the resource usage in the EPS can be billed. Hence all activities to assess the requested resource usage, to determine its value in monetary or other units, and to debit these units from the subscriber account, must occur prior to or at least, during the resource usage, i.e. online with respect to resource usage. Depending on the circumstances, a final evaluation must occur when resource usage ends. Two cases of performing online charging are described:

Direct Debiting: the requested resource can be determined and billed in a one-off procedure. In that case, the resource usage is debited from the subscriber account immediately when processing the charging event, and the permission for the resource usage is returned to the network. An example of this may be the forwarding of a terminating short message. In this scenario, it is generally required that the network can guarantee resource usage execution in order to avoid over-billing the user.

Unit Reservation: the OCS cannot a priori know the amount of resources that the end user may eventually consume, or it cannot be assumed a priori that the resource usage request can be (completely) fulfilled. In this case, a certain amount of (monetary or non-monetary) units is blocked, or reserved, on the subscriber's account on the OCS, and permission to use an amount of resources that matches the unit reservation is returned to the network. When the granted units have been used or a new, not yet authorized chargeable event occurs, the network must send a new request for unit allocation to the OCS. When resource usage has been executed, the actual amount of resource usage (i.e. the used units) must be returned by the NE to the OCS so that eventually over-reserved amounts can be re-credited to the subscriber account, assuring that the correct amount gets debited.

In present OCS, the amount to be reserved by Online Charging System (OCS) is more or less fixed/pre-configured depending upon for example the rating and services are either denied or granted or interrupted if the subscriber account is depleted.

SUMMARY

It is an object of the present invention to obviate or mitigate at least one disadvantage of the prior art and to enable a prepaid subscriber to reserve charging units to secure a complete download of a selected application without interrupting the application download due to depleted prepaid account.

Unlike current solutions, the Online Charging System, OCS, in the present specification receives from the user equipment the actual volume of data required to download the selected application by the user/subscriber enabling the OCS to reserve the required credit or units from the subscriber account or attempt to replenish to secure enough units or credits to secure complete download of the selected application without any interruption. Additionally, this specification discloses a capability for the OCS to only charge for usage of resources corresponding to successful and completed application download. In present Online Charging System, OCS, the amount to be reserved is more or less fixed/pre-configured depending upon for example the rating. Consequently, services are either denied or granted or interrupted if the subscriber account is depleted and since the subscriber account is debited based on resource usage, subscriber account is debited even if the application download has not completed.

In one embodiment a method of reserving charging units by a user for an application download where the method is executed at the user equipment and where the user equipment is connected to a telecommunication network, such as Evolved Packet System, EPS, the method comprising the steps of determining a downloadable size of a selected application for download from an application distribution server, wherein the downloadable size corresponds to the size of the application as provided by the application store platform. The user equipment then sends a request to the telecommunication network, which may be a NAS request to the MME, in order to reserve the charging units and resources in accordance with the downloadable size. The request comprises the downloadable size of the selected application and an identification of the application distribution server from where the application is downloaded. When the telecommunication network receives a response indicating that the charging units are reserved in accordance with the downloadable size of the selected application, the user equipment starts downloading the selected application from the application distribution server.

In one embodiment, the request comprises a rating of the selected application. The rating indicating if the application is suitable for the user requesting the application download. In another embodiment, the method includes establishing a dedicated resource for downloading the selected application.

In one embodiment, the method additionally comprises indicating to the telecommunication network when the application download has completed according to the downloadable size and may further comprise indicating to the telecommunication network when the application download has failed.

In one embodiment a method of enforcing authorization rules for an application download at a gateway such as a packet data gateway is described where in the gateway execute the step of obtaining an authorization rule from a policy server for reserving resources required for downloading a selected application by a user equipment, the authorization rule comprises a downloadable size of the selected application and a packet filter identifying the selected application. The gateway additionally executes the step of transferring data corresponding to the download of the selected application by the user equipment over the reserved resource until the volume of transferred data matches the downloadable size.

In one embodiment, the method at the gateway further comprises receiving a request for reserving charging units and resources for downloading the selected application at the user equipment, wherein the request comprises the downloadable size of the application and an identification of the application distribution server.

In another embodiment, the method at the gateway further comprises the step of obtaining confirmation that charging units are reserved in accordance with the downloadable size prior to transferring the data to the user equipment and may also comprise receiving a notification indicating the application download is completed and deleting the authorization rule.

In one embodiment, the method at the gateway further comprises receiving a notification indicating the application download has failed and ensuring that charging is not applied for failed download and may further comprise notifying the policy server that the volume of transferred data matches the downloadable size.

In one embodiment a method of authorizing application download at an online charging server, is described where the online charging server executes the steps of receiving a request comprising a downloadable size of an application to download by a user equipment, and wherein the request is for reserving charging units in accordance with the downloadable size of the application. The online charging server then executes the step of evaluating the charging units corresponding to the downloadable size of the application based on prepaid balance available in corresponding subscriber account and responsive to an evaluation resulting in that the charging units are insufficient to authorize the application download, replenishing the corresponding subscriber account to enable the application download and sending a response to the request, where the response indicates a reservation status (successful or failed) of the charging units for the application download.

In one embodiment, the method in the online charging server further comprises receiving a notification that the application download has failed at the user equipment and may further comprising receiving a notification that the application download has successfully completed at the user equipment.

One embodiment describes a method executed at a policy server of authorizing an application download at a user equipment, where the policy server is configured to receive a request for authorizing reservation of charging units and resources for downloading an application at a user equipment, and where the request comprises a downloadable size of the application and an identification of the application distribution server. The policy server is further configured to enable interaction with an online charging system to reserve the charging units in accordance with the downloadable size and to determining based on the downloadable size the authorization rule for the application download. Furthermore, the policy server is configured to send the authorization rule for enforcement at a gateway such as a packet data gateway, and where the authorization rule comprises the downloadable size of the application and a corresponding packet filter identifying packets belonging to the application. The policy server is also configured to send instruction to inform the user equipment if the reservation is successful or failed.

In one embodiment, the policy server is configured to instruct the gateway or packet data gateway to interact with the online charging system for charging credit authorization and reservation. In another embodiment the policy server is configured to send to the online charging system a request to reserve charging credit in accordance with the downloadable size of the application. In another embodiment, the policy server requests the user equipment to send notifications for successful and failed application download.

BRIEF DESCRIPTION OF THE DRAWINGS

Embodiments of the present invention will now be described, by way of example only, with reference to the attached Figures, wherein.

DETAILED DESCRIPTION

The following acronyms are used throughout this disclosure.

5G $5^{th}$ Generation

3GPP 3rd Generation Partnership Project
EPC Evolved Packet Core
EPS Evolved Packet System comprising an EPC and an Evolved Universal Terrestrial Access Network.
EUTRAN Evolved Universal Terrestrial Access Network
UE User Equipment
IMS Internet Protocol Multimedia Subsystem
IP Internet Protocol
IOS iPhone Operating System
LTE Long Term Evolution
MMS Multimedia Messaging Service
NE Network Entity
OCS Online Charging server
UMTS Universal Terrestrial Access Network The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

The invention will be described by means of the 3GPP Evolved packet system, EPS 200 in FIG. 1 (prior art), by means of terminology which is taken from the 3GPP standards. An EPS consists of a combined access network (EUTRAN 106) and an EPC comprising an MME 101, a SGW 102a, a PGW 102 and a policy server (PCRF 103). It should however be emphasized that the invention is also applicable within any systems that use online charging capabilities such as 5G core, GPRS core and the like. Note that this specification uses Online Charging System and Online Charging Server interchangeably.

Figure 1:
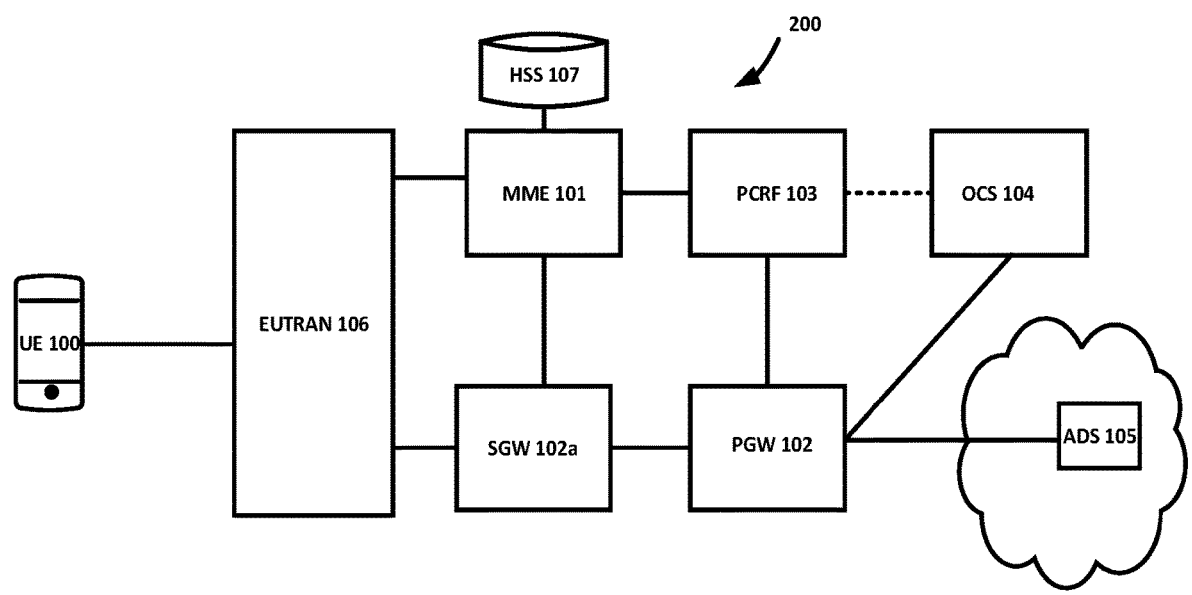
FIG. 1 (Prior art) is a schematic illustration of the 3GPP EPC architecture and interaction with 3GPP OCS.
Figure 2:
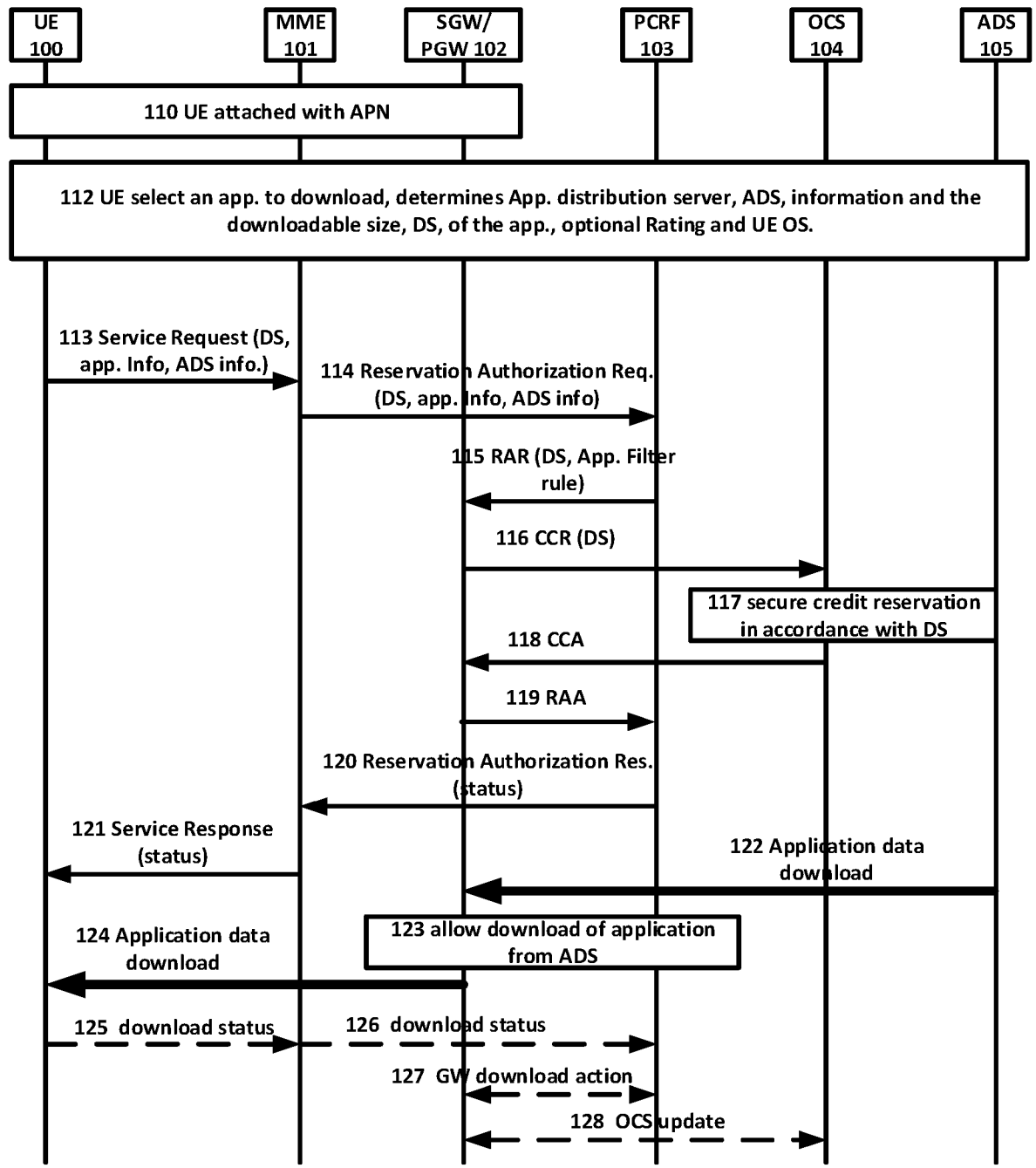
FIG. 2 illustrates a sequence diagram within a 3GPP network for reserving credit and network resources for the purpose of downloading an application in accordance with UE provided downloadable size of the application according to one embodiment.

The 3GPP EPS 200 illustrated in FIG. 1 (Prior art) used as exemplary system in this specification comprises the following main entities:

A User Equipment, UE 100, may be a smartphone, a tablet, a computer or any similar device and supports cellular wireless connectivity such as LTE, 5G access, UMTS, etc. and/or wireline connectivity enabling the UE 100 to connect to the network. The UE 100 supports Internet protocol, IP, and an operating system that enables the UE 100 to support various applications and to download applications from application market stores such as app store, android, windows store and the like. FIG. 2 illustrates an embodiment where the UE 100 supports LTE Network Access Stratum, NAS, protocol as the connectivity interface towards the Mobility management entity, MME 101, via the Evolved Universal Terrestrial Radio Access Network, EUTRAN (not shown).

A Mobility Management Entity, MME 101, is a control entity that provides access for the UE 100 to the EPS core network services. The MME 101 provides mobility management and session management. More specifically, the MME 101 authenticates the UE 100 at initial attach to the EPS core network, selects EPS core network entities: Serving Gateway, SGW (not shown in FIG. 2), and packet data gateway, PGW 102 over which it enables the packet data bearer, also referred to as EPS bearer, to be established. The EPS bearer provides the data path between the UE 100 and the PGW 102 and allows the UE 100 to communicate through the PGW 102 with entities in intranet, internet or extranet. The MME 101 controls handovers of the UE 100 from base station to base station within the same access network or different access networks. The MME 101 specified in 3GPP TS 23.401 supports UEs over LTE access. It is understood, that the MME 101 is used as an exemplary embodiment to describe this invention. However, similar entities supporting different access technologies could be used, such as SGSN in UMTS, 5G core mobility management entity and the like. The MME function, MME 101 may be deployed as a standalone server, or co-located with other entities in the EPS core network (i.e., EPC) or EPS access network (i.e., EUTRAN), or deployed as a virtual function in operator cloud.

A Packet Data Gateway, PGW 102, is the anchor point providing IP address(es) to the UE 100. The PGW 102 is the terminating point for one or more EPS bearer established with the UE 100 over other EPS entities such as SGW and EUTRAN. All IP traffic exchanged between the UE 100 and entities in intranet, extranet or Internet reachable through the PGW 102 is transmitted between the UE 100 and the PGW 102 over the established EPS bearer(s). The PGW 102 interacts with the policy and charging rules control function, PCRF 103. It enforces the policy control and charging, PCC, rules received from the PCRF 103. The PCC rules are used by the PGW 102 to enforce different rates and charging models for the packet data session based on UE roaming status, location information, time of the day, quality of service, etc. The charging rule indicates if online charging can be applied in which case the PGW 102 interacts with the OCS 104 to perform credit control. It is understood, that the PGW 102 is used as an exemplary embodiment to describe this invention. However, similar entities could be used, such as home agent, or a 5G anchor gateway and the like. The PGW function, PGW 102 may be deployed as a standalone node, or co-located with other entities in the EPS core network (i.e., EPC) or EPS access network (i.e., EUTRAN), or deployed as a virtual function in operator cloud.

A Policy Control and Charging Rules function, PCRF 103 is a policy server that provisions PCC rules into the corresponding enforcement functions as the PGW 102 as specified in 3GPP TS 23.203. It is also known that the PCRF 103 may interact with the OCS 104 to enforce policies based on subscriber spending limits as per 3GPP TS 22.115 and enable usage monitoring where the PCRF could block or allow a service based on the spending limit report received from the OCS 104.

An Online Charging system, OCS 104 is specified in 3GPP TS 32.296. The 3GPP OCS supports the following mechanisms:
  online bearer charging towards access/EPS core network entities (e.g. PGW);

online charging of applications/services that are provided to subscribers via service nodes (that are outside the core network) e.g. MMS and location based services;

IMS online charging;

account balance management towards external account management servers e.g. recharge server, hot billing server;

generation of Charging Data Records, CDRs, and their transfer to the operator's post-processing system;

spending limit and balance monitoring and reporting based on subscription or configuration within OCS, towards Policy and Charging Rule Function.

FIG. 2 illustrates a sequence diagram for reserving credit and network resources for the purpose of downloading an application in accordance with UE provided downloadable size of the application using the 3GPP Evolved packet system, EPS, as the network providing IP connectivity to the UE 100 according to one embodiment.

The UE 100 is illustrated at step 110 as already being attached to a PGW 102 in the EPC. In the illustrated embodiment, the UE's subscriber is a prepaid subscriber and has a prepaid account in the OCS 104 against which the EPS bearer resource usage can be billed. When attached, the UE 100 is assigned an IP address and is connected to the PGW 102 via a default EPS bearer and optionally one or more dedicated EPS bearers over which IP traffic is transported between the UE 100 and entities behind the PGW 102. At step 112, the user uses the UE 100 to select an application to download from an application distribution server, ADS, 105. Depending on the UE operating system, the UE uses an app store, google play, window store platform or the like to download the application. The platform may provide the size of the application in number of bytes and the application rating to indicate suitability for the users. For example, the appstore on iPhone Operating System, IOS, could indicate the size of the application and any of the following ratings:

4+ Applications in this category contain no objectionable material. Suitable for 4 years old and older.

9+ content suitable for 9 years old and older.

12+ content suitable for 12 years old and older.

17+ content suitable for 17 years old and older.

Presently, the size of the application indicated by the platform is used by the user to manage the local storage in the UE. For example, the user/UE determines if there is enough local storage on the UE 100 to download the application, and make UE storage available for the application by either uploading other data stored in the UE 100 onto the cloud or deleting the data.

Once the UE 100 selects the application to download at step 112, it determines the identification of the application distribution server, ADS 105, which may be preconfigured in the UE 100 or discovered via any existing mechanisms that are known by a person skilled in the art. The identification comprises the IP address of the ADS 105 and/or a port number. The UE 100 additionally obtains the size of the application to download from the app store application, herein referred to as the downloadable size of the application. Optionally, the UE 100 obtains the rating of the application which corresponds to the rating indicated in the description of the application in the app store. As the user selects the application to initiate or request the download, the information, comprising the downloadable size of the application, the ADS 105 identification and optionally the rating is passed from the application layer (e.g., app store application) to the NAS layer in the UE 100 to trigger a NAS service request or any suitable NAS message at step 113 to request that the network allocates charging units from the prepaid account in accordance with the downloadable size of the application.

The NAS service request illustrated at step 113 is sent to the MME 101 over the NAS layer and includes the downloadable size of the application to download and identification of the ADS 105. The NAS service request may include the application rating which may be used by the network to determine if it should allow or block the application download. The MME 101 determines that the request is for allocating charging units in accordance with the downloadable size of the application and triggers a message at step 114 to the policy server, PCRF 103, to request authorization for reservation and usage of the EPS bearer resources in accordance with the received NAS service request message.

At step 114, the PCRF 103 receives the request for authorizing the reservation and usage of EPS bearer resources for downloading the application. The request provides the downloadable size of the application and the identification of the ADS 105. The PCRF 103 determines that the corresponding subscriber is authorized for online charging, checks the network policy for any service level agreements with the provider of the ADS 105 to determine if quality of service resource should be established prior to downloading the application.

If the PCRF 103 determines that a different resource other than the default EPS bearer should be used for the application download, it creates an authorization rule comprising a different quality of service parameters (e.g., different QCI) and a downlink packet filter comprising the identification of the ADS 105 identifying the application data (e.g., source IP address and/or source port number of the ADS 105) and the downloadable size. If the application download can be done over the default bearer, the authorization rule will apply to the default bearer. The authorization rule may include an indication to release the resource and/or delete the authorization rule once the application download is completed in accordance with the downloadable size. Alternatively, the PCRF 103 may include an event trigger requesting the PGW 102 to notify the PCRF 103 when the downloadable size of the application is reached. Alternatively, in another embodiment, the PCRF 103 may request the PGW 102 in the authorization rule to not release the reserved resources until the gateway receives a confirmation indicating that the application download has completed.

The authorization rule also indicates that the credit control or credit authorization should be performed by the PGW 102 with the OCS 104 prior to allowing transfer of data related to the application download. The authorization rule is provisioned at the PGW 102 by the PCRF 103 at step 115.

In one embodiment, if the request at step 114 includes the application rating, the PCRF 103 verifies if the rating of the selected application for download is compatible with the user profile associated with the UE 100. If the rating is not compatible with the user profile, the request at step 114 could be denied.

At step 116 of the embodiment in FIG. 2, the PGW 102 requests from the OCS 104 credit authorization in accordance with the downloadable size of the application as provided in the authorization rule. The credit authorization or credit control request illustrated in FIG. 2 includes the downloadable size of the application as provided by the UE 100.

At step 117, the OCS 104 uses the downloadable size and other rating parameters such as the service type (application download), the network and resource type to determine the applicable price or tariff model to apply for downloading the application data. Once the price is determined, the OCS 104 determines if the subscriber prepaid account units are sufficient to allow the download. If sufficient units are available, the OCS 104 reserves the units corresponding to the downloadable size provided by the UE 100 and sends a response to the PGW 102 at step 118 to indicate that the download is authorized and that the prepaid units are reserved for the data volume corresponding to the downloadable size.

In another embodiment, not illustrated in FIG. 2, if the prepaid units are not sufficiently available in the subscriber prepaid account to cover for the application download, the OCS 104 may, at step 117, determine the missing prepaid units to cover the download of the requested application and attempt to replenish the subscriber account by sending an indication to the PGW 102 to redirect the user to the replenishing server. The user is notified through the replenishing server about the prepaid units required for downloading the requested application and the available prepaid units currently available to give the subscriber the option to replenish with at least enough units to cover downloading the requested application. If the account is replenished and sufficient units are made available at the OCS 104, the OCS 104 sends a response to the PGW 102 at step 118 to indicate a successful reservation status, i.e., that the corresponding prepaid units for downloading the requested application are authorized and that the units are reserved for the data volume corresponding to the downloadable size of the requested application. If the replenishing failed, the OCS 104 responds to the PGW 102 at step 118 with a failed reservation status, i.e., failure to reserve the charging unit, unauthorized application download and may include an indication about the required prepaid or charging units to secure the application download.

Back to FIG. 2 and at step 119, the PGW 102 installs the authorization rule and establishes a dedicated bearer if a different quality of service is required for the application download. The dedicated resource is reserved for the requested application download. Only traffic matching the filter corresponding to packets from the ADS 105 will be allowed to be transmitted over the dedicated bearer. The traffic allowed is equivalent to a volume of data corresponding to the downloadable size of the selected application. The PGW 102 sends at step 119 a message to the PCRF 103 indicating successful installation of the authorization rule in response to the message received at step 115. If the credit authorization has failed, the PGW 102 provides to the PCRF 103 the failure indicators as provided by the OCS 104.

At step 120, the PCRF 103 sends a response back to the MME 101 indicating the status of the credit authorization for the application download. In the embodiment illustrated in FIG. 2, the status indicates successful credit allocation for application download. In alternative embodiments, the status may indicate insufficient credit and provides the prepaid units required for the application download in the event the OCS 104 did not manage to replenish the account. The PCRF 103 may instruct the UE 100, via the MME 101, to send notification back to the PCRF 103 when the application download has completed or when the application download has failed leading to an unfulfilled application download request. This provides the PCRF 103 with the capability to notify the PGW 102 which will then notify the OCS 104 to prevent charging the subscriber for the usage of the resources when the delivery of the service over the reserved resource has failed according to the operator's policy.

The MME 101, at step 121 sends a NAS service response message or a suitable NAS message to relay the response received from the PCRF 103 to the UE 100. The NAS service response message includes the status parameter indicating successful credit allocation or unsuccessful credit allocation with the reason for failure.

If the failure is due to insufficient credits and the required credit for downloading the application is provided, the user/subscriber may attempt to replenish the account and attempt a new NAS service request.

At step 122, the ADS 105 starts downloading the application data on the UE 100. At step 123, the PGW 102 receives the data, performs traffic mapping by mapping the incoming packets to the downlink packet filter installed as part of the authorization rule. The PGW 102 determines if there is a match between the source IP address and/or port number in the packet header of the received packets and the source IP address and/or port number of the downlink packet filter. If a match is found, the PGW 102 maps the corresponding ADS 105 traffic to the reserved resource and keep tracks of the data volume transferred in accordance with the downloadable size. If the data volume (in number of bytes or number of packets) transferred is less than the downloadable size, the PGW 102 transfers the received packets to the UE 100 over the dedicated bearer as shown at step 124.

FIG. 2 illustrates an embodiment where when the UE 100 has determined that the application download has completed, at step 125, it may send a suitable NAS message to the MME 101 (if instructed at step 120) to indicate that the application download is completed. At step 126, the MME 101 forwards the information to the PCRF 103. At step 127, if the PCRF has previously included in the authorization rule an indication to not release the reserved resources until confirmation is received indicating that the application download has completed, the PCRF 103 sends a message to the PGW 102 to indicate that the application download is completed and that the authorization rule can be removed. If a dedicated EPS bearer resource was established for the authorization rule, the PGW 102 releases the resource, else the PGW 102 simply deletes the authorization rule. The PGW 102, at step 128, may then inform the OCS 104 that the application download has completed in order for the OCS 104 to finalize debiting the subscriber account. If this step is omitted, the prepaid subscriber account may have been debited prior to the start of the application download.

On the other hand, if the application download fails because the download was for example interrupted because of for example low battery during download or routing problems, the UE 100 may send a suitable NAS notification to the MME 101, if instructed at step 120, to indicate that the application download has failed to request that the credit be reassigned. This may be useful if the OCS 104 has debited the subscriber account prior to the start of the download.

FIG. 2 illustrates an embodiment where the UE signals the downloadable size of the selected application for download, however other embodiment (not shown in any figure) is possible wherein upon the UE 100 selects the application for download, the ADS 105, instead of the UE 100, communicates to the PCRF 103 the downloadable size of the selected application and the identification of the ADS 105. The latter identifies the source IP address and/or port number that would be included in the IP header of the packets corresponding to the selected application. Once the PCRF 103 receives the information from the ADS 105 it proceeds by executing applicable steps 115 to 127 as described in FIG. 2. If the PCRF 103 performs credit authorization as shown in FIG. 3, then applicable steps 115*b*, 116*b* to 128*b* would be executed after the PCRF 103 receives the information from the ADS 105.

Figure 3:
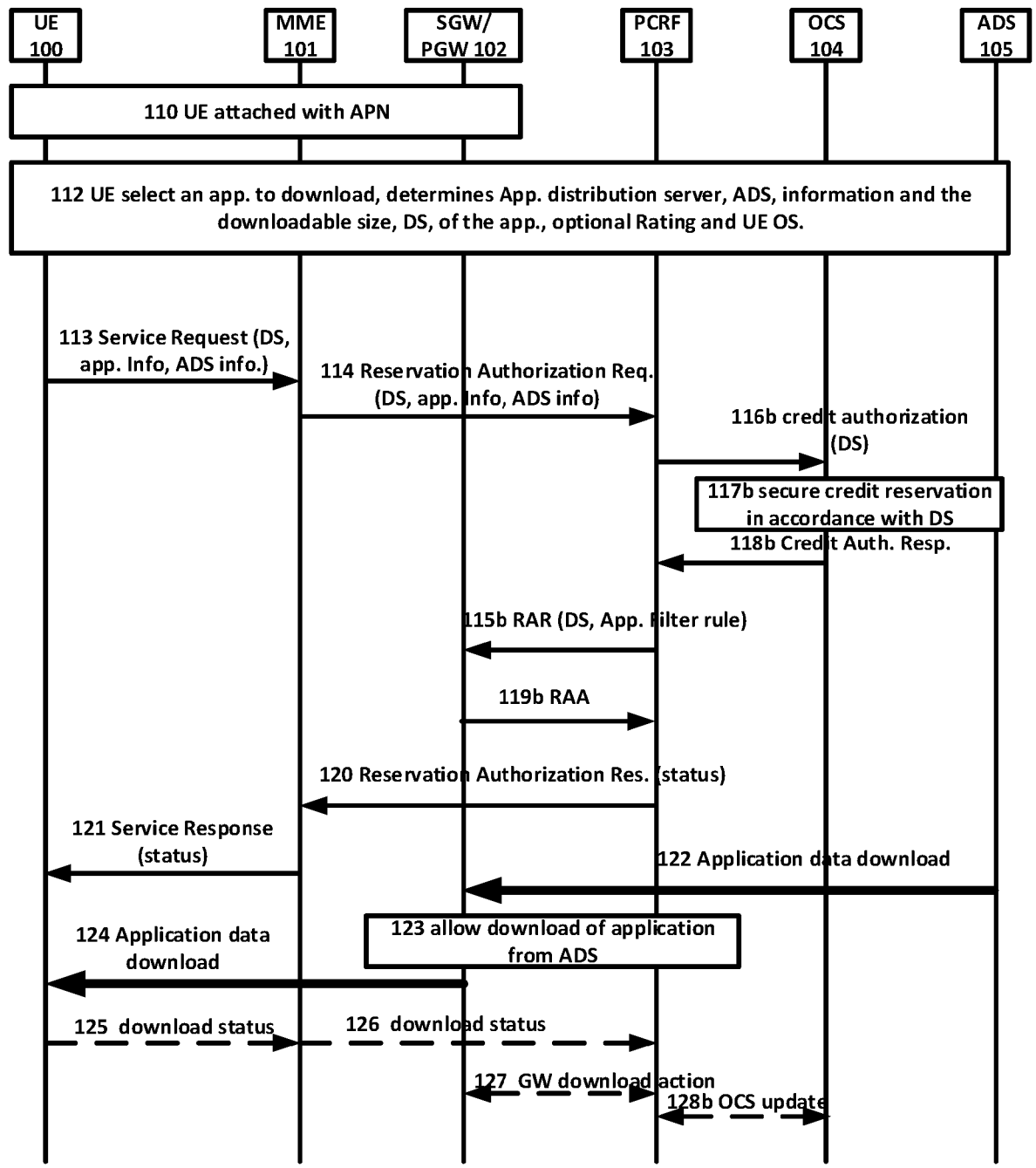
FIG. 3 illustrates a sequence diagram within a 3GPP network for reserving credit and network resources for the purpose of downloading an application in accordance with UE provided downloadable size of the application according to another embodiment.

FIG. 3 illustrates a sequence diagram for reserving credit and network resources for the purpose of downloading an application in accordance with UE provided downloadable size of the application using the 3GPP Evolved packet system, EPS, as the network providing IP connectivity to the UE 100 according to another embodiment.

Step 111 to step 114 of the embodiment illustrated in FIG. 3 are identical to step 111 to step 114 of the embodiment illustrated in FIG. 2. Similarly, steps 120 to step 127 of the embodiment illustrated in FIG. 3 are identical to steps 120 to step 127 of the embodiment illustrated in FIG. 2. In the embodiment illustrated in FIG. 3, the PCRF 103 performs credit authorization instead of the PGW 102 as described above for the embodiment illustrated in FIG. 2. The following focuses on describing steps 115b to 119b and step 128b as illustrated in FIG. 3:

When the PCRF 103 receives the request for authorizing the reservation and usage of EPS bearer resources for downloading the application, where the request comprises the downloadable size of the application and the identification of the ADS 105, the PCRF 103 determines that the corresponding subscriber is authorized for online charging. The PCRF 103 checks the network policy for any service level agreements with the provider of the ADS 105 to determine if quality of service resource should be established prior to downloading the application. At step 116b, the PCRF 103 requests credit authorization from the OCS 104 in accordance with the downloadable size of the application as provided by the UE 100. The credit authorization illustrated in FIG. 3 includes the downloadable size of the application as provided by the UE 100 and other rating parameters including the required quality of service, the network identification, the service type (application download), etc.

At step 117b, the OCS 104 uses the downloadable size and other rating parameters to determine the applicable price or tariff model to apply for downloading the application data. Once the price is determined, the OCS 104 determines if the subscriber prepaid account units are sufficient to allow the entire download. If sufficient units are available, the OCS 104 reserves the units corresponding to the downloadable size provided by the UE 100 and sends a response to the PCRF 103 at step 118b to indicate that the corresponding prepaid units for downloading the application are authorized and that the prepaid units are reserved for the data volume corresponding to the downloadable size.

In another embodiment, not illustrated in FIG. 3, if the prepaid units are not sufficiently available in the subscriber prepaid account to cover for the application download, the OCS 104 may, at step 117b, determine the missing prepaid units to cover the download and attempt to replenish the subscriber account by sending an indication to the PCRF 103 to redirect the user to the replenishing server. As a result, the PCRF 103 may inform the PGW 102 to redirect the user traffic to the replenishing server. The user is notified through the replenishing server about the prepaid units required for the requested application download and the available prepaid units currently available to give the subscriber the option to replenish with at least enough units to cover the requested application download. If the account is replenished and sufficient units are made available at the OCS 104, the OCS 104 sends a response to the PCRF 103 at step 118b as illustrated in FIG. 3 to indicate a successful reservation status, i.e., that the download is authorized and that the units are reserved for the data volume corresponding to the downloadable size. If the replenishing failed, the OCS 104 responds to the PCRF 103 at step 118b to indicate a failed reservation status, i.e., failure to authorize and reserve the credit and an indication about the required prepaid units to secure the application download.

Back to FIG. 3 and at step 115b, the PCRF 103 uses the response from the OCS 104 to determine the authorization rule to be provisioned at the PGW 102. If the credit reservation and authorization is successful, the PCRF 103 checks the network policy for any service level agreements with the provider of the ADS 105 to determine if quality of service resource should be established prior to downloading the selected application.

If the PCRF 103 determines that quality of service resource should be used for downloading the requested application, it creates an authorization rule comprising a different quality of service parameters (e.g., different QCI) and a downlink packet filter comprising the identification of the ADS 105 (e.g., source IP address and/or source port number of the ADS 105) and the downloadable size. If the application download can be done over the default bearer, the authorization rule will apply to the default bearer. The authorization rule additionally indicates if the resource is to be released once the application download is completed in accordance with the downloadable size. Alternatively, the PCRF 103 may include an event trigger notification requesting the PGW 102 to notify the PCRF 103 when the downloadable size of the application is reached. Alternatively, in yet another embodiment, the PCRF 103 may signal to the PGW 102 in the authorization rule an indication to not release the reserved resources until confirmation is received indicating that the application download is completed.

At step 119b, the PGW 102 installs the authorization rule and establishes a dedicated bearer if a different quality of service is required for the application download. The dedicated resource is reserved for the application download. Only traffic matching the filter corresponding to packets from the ADS 105 will be allowed to be transmitted over the dedicated bearer. The traffic allowed is equivalent to a volume of data corresponding to the downloadable size of the application. The PGW 102 sends at step 119b a message to the PCRF 103 indicating successful installation of the authorization rule in response to the message received at step 115b.

Similar to step 120 of FIG. 2, the PCRF 103 sends a response back to the MME 101 indicating the status of the credit authorization for the application download. The MME 101, at step 121 sends a NAS service response message or a suitable NAS message to relay the response received from the PCRF 103 to the UE 100. In the embodiment illustrated in FIG. 3, the status indicates successful credit allocation for application download. In alternative embodiments, the status may indicate insufficient credit and provides the prepaid units required for the application download in the event the OCS 104 did not manage to replenish the account. The PCRF 103 may instruct the UE 100, via the MME 101, to send notification back to the PCRF 103 when the application download has completed or when the application download has failed leading to an unfulfilled application download request. This provides the PCRF 103 with the capability to notify the OCS 104 at step 128b to prevent charging the subscriber for the usage of the resources when the delivery of the service over the reserved resource has failed according to the operator's policy.

If the UE 100 has determined that the application download has completed, it may send, at step 125, a suitable NAS message to the MME 101 (if instructed at step 120) to indicate that the application download has completed. At step 126, the MME 101 forwards the information to the PCRF 103. Step 127 in FIG. 3 is similar to step 127 in FIG. 2, except that PGW 102 does not need to interact with the OCS 104. The PCRF 103, at step 128b, may then inform the OCS 104 that the application download has completed in order for the OCS 104 to finalize debiting the subscriber account. If this step is omitted, the prepaid subscriber account may have been debited prior to the start of the application download.

It is worthwhile to note that while FIG. 2 and FIG. 3 illustrate a direct interaction between the MME 101 and the PCRF 103, the same interaction may instead take place between the PGW 102 and the PCRF 103, in which case the MME 101 signals the information received from the UE 100 to the PGW 102 and the PGW 102 interacts with the PCRF 103. Such model of interaction is based on some principles shown in the standardized 3GPP policy control and charging framework as specified in 3GPP TS 23.203.

Figure 4:
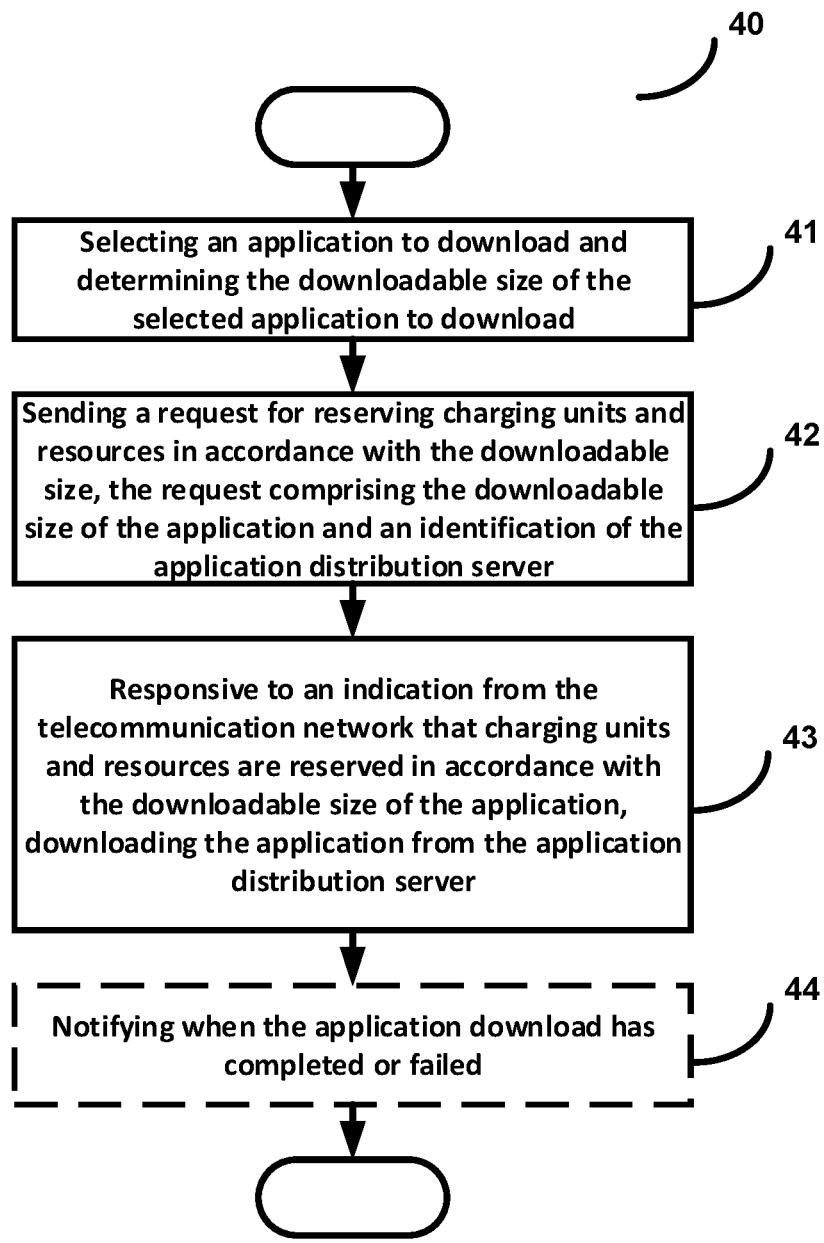
FIG. 4 illustrates a method at a UE of reserving credit and network resources for the purpose of downloading an application in accordance with UE provided downloadable size of the application according to an embodiment.

FIG. 4 illustrates a method 40 of reserving credit and network resources for the purpose of downloading an application in accordance with downloadable size of the application provided by the UE according to an embodiment. The method 40 is executed at an already attached UE and describes the steps at the UE for using a selected application size as provided by the application store platform for the purpose of reserving credit from the UE's subscriber prepaid account to enable downloading the selected application into the UE. The UE is already attached to a network, for example a PGW in the EPC and the UE's subscriber is a prepaid subscriber having a prepaid account in the OCS against which the EPS bearer resource usage can be billed. When attached, the UE is assigned an IP address and is connected to the PGW via a default EPS bearer and optional dedicated EPS bearers over which IP traffic is transported between the UE and entities behind the PGW. At step 41, the user uses the UE to select an application to download from an ADS. Depending on the UE operating system, the UE uses an app store, google play, window store platform or the like to download the application. It is known that the app store platform provides the size of the selected application in number of bytes and the application rating to indicate suitability for the users as described above. Presently, the size of the application indicated by the app store platform is used by the user to manage the local storage in the UE.

Once the UE selects the application to download, it obtains the identification of the ADS which may be preconfigured in the UE or discovered via any existing mechanisms that are known by a person skilled in the art. The identification comprises the IP address of the ADS and/or a port number. The UE obtains the size of the application to download from the app store platform, herein referred to as the downloadable size of the application. Optionally, the UE obtains the rating of the application which corresponds to the rating indicated in the description of the application in the app store platform. At step 42, the information, comprising the downloadable size of the application, the ADS identification and optionally the rating is passed from the application layer (e.g., app store platform) to the NAS layer in the UE to trigger a NAS service request or any suitable NAS message to request that the network allocates charging units from the UE's subscriber prepaid account in accordance with the downloadable size of the application.

At step 43, the UE receives a response to the NAS service request sent at step 42. The response indicates successful credit allocation and a dedicated bearer may be established by the network to be used for the application download. Alternatively, an unsuccessful credit allocation may be received at the UE with the reason for failure.

Note that If the failure is due to insufficient credits and the required credit for downloading the application is provided, the user/subscriber may attempt to replenish the account and attempt a new NAS service request. The response to the NAS service request may also include instructions to the UE to send notification back to the network via the NAS layer when the application download has completed or when the application download has failed leading to an unfulfilled application download request.

Method 40 illustrates a successful reservation of credit, at which point the UE starts downloading the application at step 43.

Once the application download is completed, and if instructed by the network, the UE may, at step 44, send a suitable NAS message to the network to indicate that the application download is completed. Alternatively, if the application download has failed, the UE may send a notification of application download failure to request that the account does not get debited for unfulfilled service.

Figure 5:
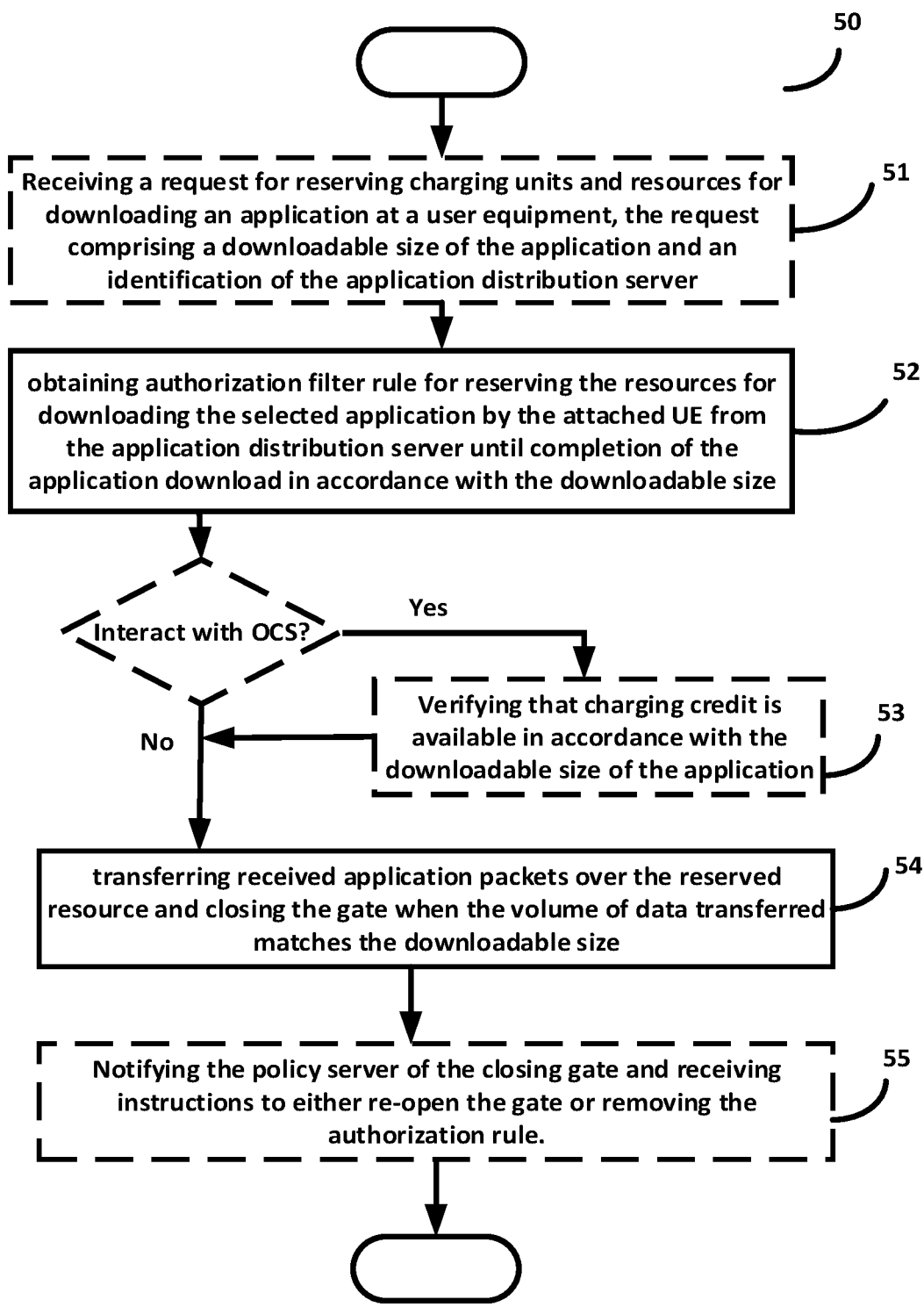
FIG. 5 illustrates a method at a gateway of authorizing transfer of application data in accordance with UE provided downloadable size of the application according to an embodiment.

FIG. 5 illustrates a method 50 at a gateway of authorizing transfer of application data in accordance with UE provided downloadable size of the application according to an embodiment. The PGW of the EPC is used as an exemplary embodiment to explain the method 50, however any gateway or node interacting with a policy server and an online charging server and act as an anchor point for UE traffic can be used.

At step 51, the PGW may receive a request to reserve charging units and resources for a selected application download by the UE. The request includes the downloadable size of the selected application, i.e., the volume in number of bytes (or packets) to transfer to the UE. The request also includes the ADS information which comprises IP address and/or port number from where the application will be downloaded. The request may include additional information such as the application rating. The PGW then sends a corresponding message to the policy server to authorize the request. Note that as illustrated in FIG. 2 and FIG. 3, the policy server (PCRF) may obtain that same authorization request directly from the MME instead of the PGW, hence step 51 is optional.

At step 52, the PGW receives authorization rule from the policy server. The authorization rule includes the ADS packet filter identifying the selected application downlink packets from the ADS (e.g., IP address and/or port number), the downloadable size of the selected application, i.e., the volume of data as provided by the UE. The authorization rule may include quality of service parameters that may trigger establishment of a new dedicated EPS bearer (resource) dedicated for the application download and may also include instruction to interact with the OCS to get charging authorization if the policy server is not able or configured to interact with the OCS. The authorization rule may also include instructions of whether the PGW should wait for further notification from the policy server prior to releasing any dedicated resource that may have been established or deleting the provisioned authorization rule. It may also include instruction to notify the policy server when the volume of data related to the application download reaches the downloadable size.

If the PGW was instructed to interact with the OCS, the PGW sends, at step 53, a credit control or credit authorization request to the OCS and includes the downloadable size of the selected application, the service type (application download), UE, subscriber and network identification, the quality of service parameters of the reserved resource if applicable (as included in the authorization rule). If the PGW receives a successful authorization that the credit is reserved for the application download or that the PGW is not instructed to interact with the OCS, it may establish a dedicated resource if different quality of service parameters (e.g., QCI, ARP) were included in the authorization rule from the policy server and binds the authorization rule to the dedicated resource (EPS bearer), else the authorization rule is mapped to an existing EPS bearer already established with the UE as shown in step 54. Note that the procedures to establish the dedicated EPS bearers are known and are specified in 3GPP TS 23.401. The PGW is authorized to transfer a volume of application data to the UE that corresponds to the downloadable size of the selected application as provided by the UE as illustrated at step 54. The PGW opens the gate and maps all packets from the ADS to the authorization filter. When the volume of data transferred over the reserved resource matches the downloadable size for which it is authorized, it closes the gate. At step 55, the PGW may notify the policy server and may receive further instructions to either re-open the gate (if the policy server has obtained indication that the download has failed) or to remove the authorization rule (if the policy server has obtained indication that the download has successfully completed).

Note that the PGW may instead receive indication from the UE through the MME if the application download is successful or failed, at which point the PGW may make its own determination to re-open the gate or release the authorization rule. However, the PGW should then be configured to interact with the OCS to secure that the subscriber is only charged for a successful delivery of the service, i.e., successful download.

In another embodiment, the PGW may instead receive an unsuccessful credit authorization and reservation at the OCS. The unsuccessful credit authorization may include the available subscriber prepaid balance and may also include the required prepaid balance for selected application download based on the downloadable size. The PGW may instruct the UE directly or through the policy server that credit reservation for selected application download has failed. The instruction to the UE includes the available subscriber prepaid balance and/or the required prepaid balance to download the selected application as received by the OCS. UE may still attempt to download the application if prepaid balance is positive, but subscriber account may be depleted prior to completion of the application download. Alternatively, UE may attempt to replenish the account at the OCS prior to initiating a new reservation request.

In another embodiment, the PGW may receive a request from the OCS or through the policy server to redirect the user traffic to a replenishing server as a result of OCS receiving the credit authorization request. The request to redirect the user traffic comprises the IP address of the replenishing server. The PGW may inform the network entities (PCRF, MME, UE etc.) that the request for credit authorization and reservation is in progress to prevent transactions timeout at the network entities. The PGW may instruct the UE directly or through the policy server that redirection to replenishing server is in progress). Once the replenishing of the user/subscriber account is completed (either failed or succeeded), the PGW receives an instruction to stop redirecting user traffic and receives the result of the credit authorization and reservation (i.e., failed or success) and proceeds as per above.

Figure 6:
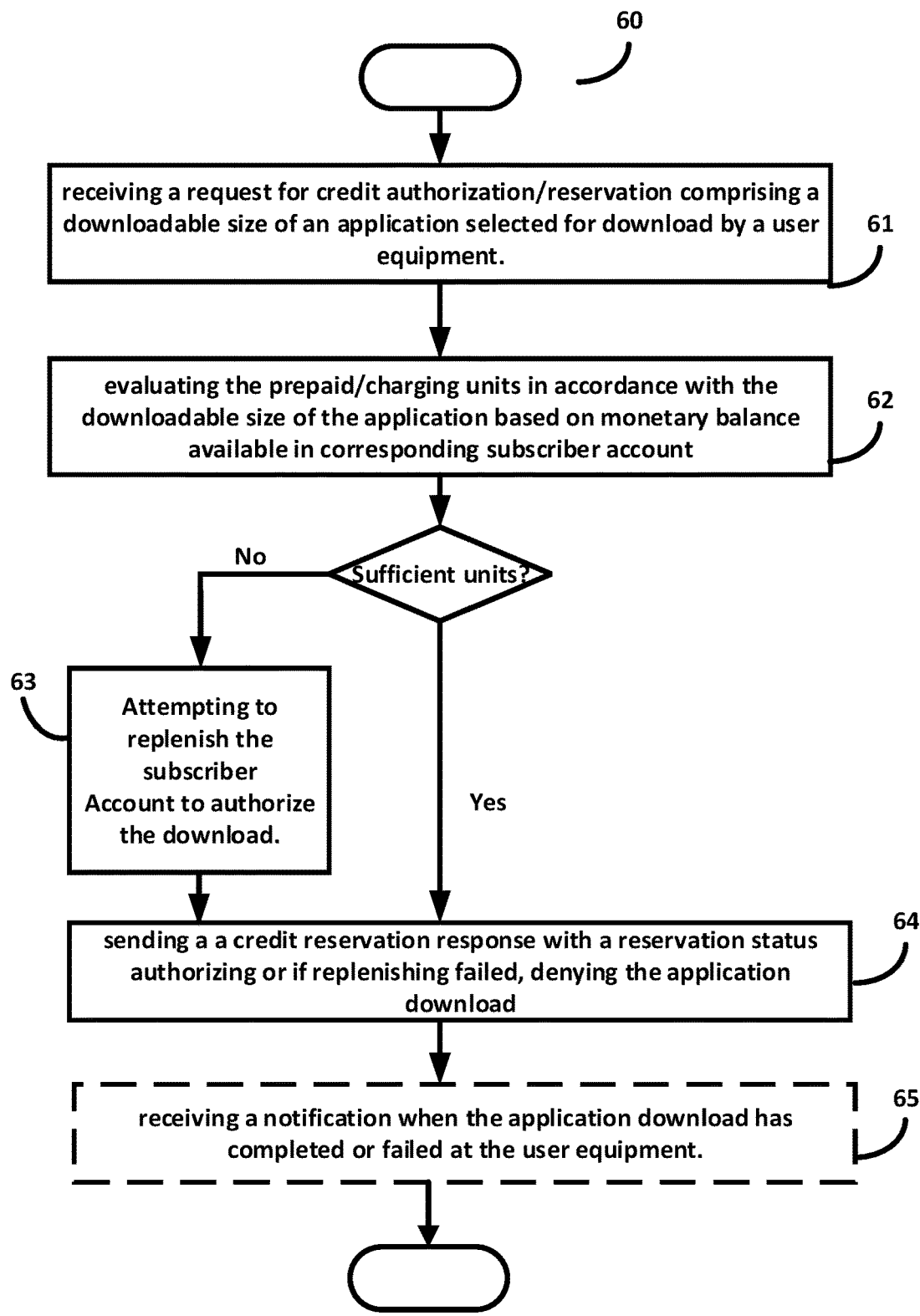
FIG. 6 illustrates a method at an online charging server of authorizing reservation of credit for the purpose of application download in accordance with UE provided downloadable size of the application according to an embodiment.

FIG. 6 illustrates a method 60 at an online charging server, OCS, of authorizing reservation of credit for the purpose of application download in accordance with UE provided downloadable size of the selected application according to an embodiment. At step 61, the OCS receives a request for credit authorization and reservation of the charging (or prepaid) units that corresponds to the downloadable size provided by the UE for the application selected for download by the UE. The request may be received from a policy server (e.g., PCRF) or a gateway (e.g., PGW). The request for credit authorization comprises the downloadable size obtained by the UE and other rating parameters such as the service type (application download), the network and resource type, quality of service, time of day, etc.

At step 62, the OCS evaluates the prepaid units required to charge the subscriber for the volume of data in accordance with the provided downloadable size of the selected application. The OCS uses the downloadable size and other rating parameters to determine the applicable price or tariff model to apply for downloading the application. Once the price is determined, the OCS determines if the subscriber prepaid account units are equal or greater than the required prepaid units to authorize the application download. If sufficient units are available (i.e., equal or greater), the OCS reserves the required prepaid units corresponding to the downloadable size and at step 64, the OCS executes the step of sending a credit reservation response to indicate that downloading the selected application is authorized and that the prepaid units are reserved for the data volume corresponding to the downloadable size. The OCS may at step 65 instruct the requester to send a notification when the application download has completed or failed to allow the OCS to debit or credit back the subscriber account.

if the prepaid units are not sufficiently available in the subscriber prepaid account to cover for the application download, the OCS executes step 63 of determining the missing prepaid units to cover the download of the requested application and attempting to replenish the subscriber account prior to sending a response indicating the status of the charging units reservation. A number of method exists to replenish the account, for example sending instruction to the network entity responsible for the credit reservation (packet data gateway or policy server (PCRF)) to redirect the user traffic to a replenishing server. The redirection takes place at the packet data gateway where the UE is attached. If the account is replenished and sufficient prepaid units are made available at the OCS, the OCS reserves the required prepaid units to authorize the application download and executes step 64 of sending a credit reservation response to indicate a successful reservation status, i.e., that the corresponding prepaid units for downloading the requested application are authorized and that the units are reserved for the data volume corresponding to the downloadable size of the requested application.

If the user fails to replenish the account at step 63 and insufficient prepaid units are available at the OCS for the complete application download in accordance with the downloadable size, the OCS sends a credit reservation response to indicate a failed reservation status and may include the available prepaid balance and/or the required prepaid units for the selected application download.

If the credit reservation was successful but the OCS receives a notification that the application download has failed for some reason, the OCS, based on operator's policy, may return the reserved prepaid units back to the subscriber account and avoid charging the subscriber for failed delivery of the service.

Figure 7:
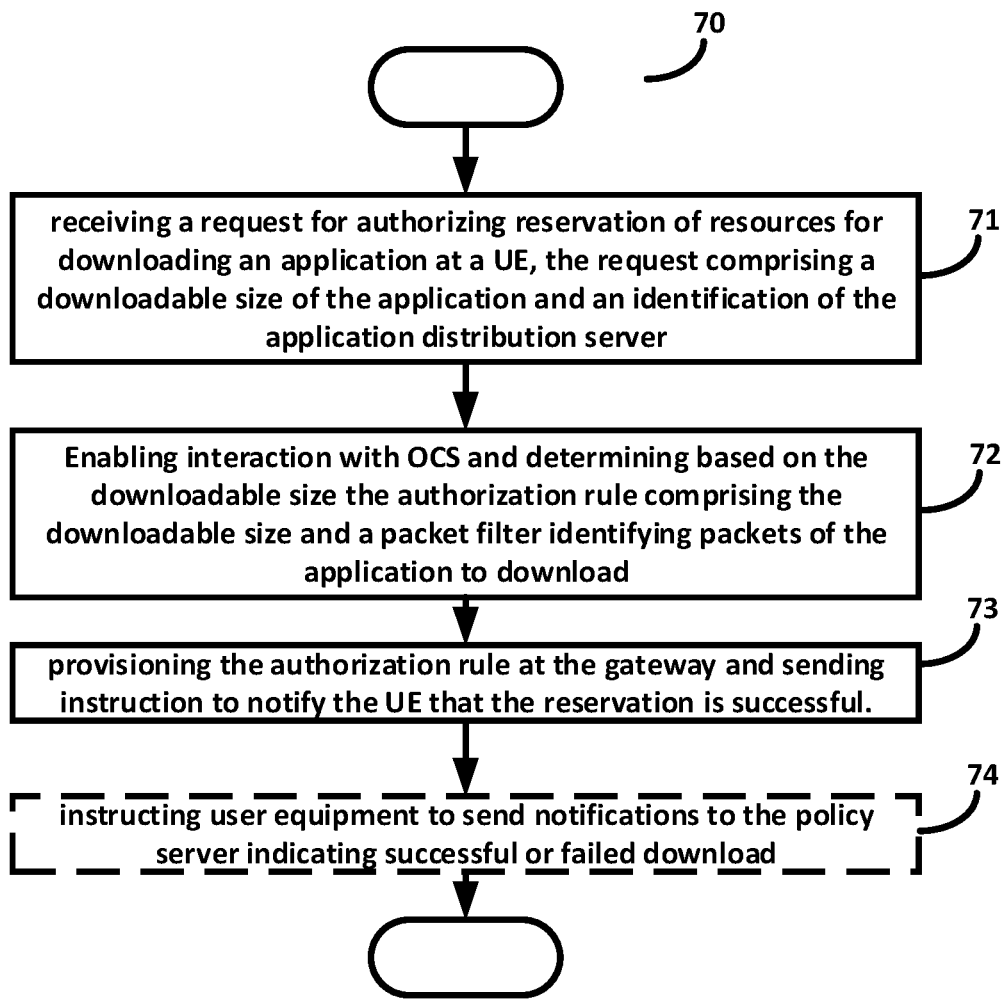
FIG. 7 illustrates a method at a policy server of authorizing network resources for the purpose of application download in accordance with UE provided application information comprising downloadable size of the application according to an embodiment.

FIG. 7 illustrates a method 70 at a policy server of authorizing network resources for the purpose of application download in accordance with UE provided application information comprising downloadable size of the application according to an embodiment. The method 70 can be executed by any policy server that is compatible with the 3GPP policy control and charging function, PCRF, or the fixed broadband access policy server or any policy server that is deployed in an IP network that supports prepaid users. The method is described using the 3GPP PCRF used with the EPC and EPS bearer resources.

The method 70 at the PCRF starts when receiving at step 71 the request for authorizing the reservation and usage of EPS bearer resources for downloading the application. The request provides the downloadable size of the application to download and the identification of the application distribution server, ADS, i.e., IP address and/or port number that is included in the application packets as source IP address and/or port number, hence enabling identification of the application packets. The request may also include the application rating, rating the suitability of the application for the user. The PCRF, at step 72 executes the step of determining the authorization rule based on the downloadable size of the selected application for download. If the rating is included and is compatible with the user profile associated with the U, then PCRF proceeds with determining the authorization rule at step 72. If the rating is not compatible with the user profile, the request for application download could be denied. The determining step 72 consists of verifying that the corresponding subscriber is authorized for online charging, checking the network policy for any service level agreements with the provider of the ADS to determine if quality of service resource should be established prior to downloading the application. If the PCRF determines that a different resource other than the already established default EPS bearer should be used for the application download, it creates an authorization rule comprising a different quality of service parameters (e.g., different QCI) and a downlink packet filter comprising the identification of the ADS (e.g., source IP address and/or source port number of the ADS). The authorization rule must include the downloadable size. If the application download can be done over the default bearer, the authorization rule does not indicate a different quality of service other than the quality of service already granted for the attached UE. The authorization rule may include an indication to release the resource or delete the authorization rule once the application download is completed in accordance with the downloadable size. Alternatively, the PCRF may also include an event trigger requesting to be notified by the gateway when the data transfer from the ADS to the UE matches the downloadable size of the application. Alternatively, the PCRF may request the gateway in the authorization rule to not release the reserved resources until the gateway receives confirmation indicating that the application download has completed.

If the PCRF does not perform credit control as illustrated in method 70, the authorization rule also indicates that the credit control or credit authorization should be performed by the gateway instructing the gateway to perform credit authorization/reservation prior to allowing transfer of data related to the application download. If the PCRF performs credit control (optional step), the PCRF first sends a credit authorization/reservation request to the online charging server to reserve the necessary prepaid units for the application download prior to provisioning the authorization rule at the gateway. If the PCRF receives a credit authorization/reservation response from online charging server indicating that the prepaid units are reserved, the PCRF at step 73 execute the step of provisioning the authorization rule at the gateway and sending instruction to notify the UE that the reservation is successful.

At optional step 74, The PCRF also executes the step of instructing the UE to send subsequent notification to the PCRF if the application download is either successful or failed. This method step may be an instruction sent together with the notification of successful reservation at step 73. Subsequently, if the PCRF receives a notification from the UE that the application download is successful, the PCRF may execute an optional step of informing the gateway to delete the authorization rule and may notify the OCS or may request the gateway to notify the OCS to allow the OCS to debit the prepaid account because the service is successfully delivered.

If the PCRF receives a notification from the UE that the application download has failed, then the PCRF executes the step of informing the OCS (if PCRF is configured to interact with the OCS) to allow the OCS to release the credit reservation and credit back the subscriber account. However, if the PCRF is not configured to interact with the OCS, the PCRF executes the step of informing the gateway about the received notification from the UE as the gateway is responsible for interacting with the OCS.

If the PCRF is configured to interact with the OCS and the OCS sends a request to redirect the user traffic to a replenishing server in response to a credit authorization request sent to the OCS, the PCRF sends a redirection request to the gateway. The redirection request includes the IP address of the replenishing server. The PCRF may instruct the involved NEs that credit authorization is in progress and may instruct, or may receive instruction to notify the user equipment that redirection to a replenishing server is in progress. This would prevent transaction timeout in the network entities involved and the UE while the user replenishes. When the PCRF receives a credit authorization response, it notifies the gateway to stop redirection and handles the credit authorization response as explained above.

Figure 8:
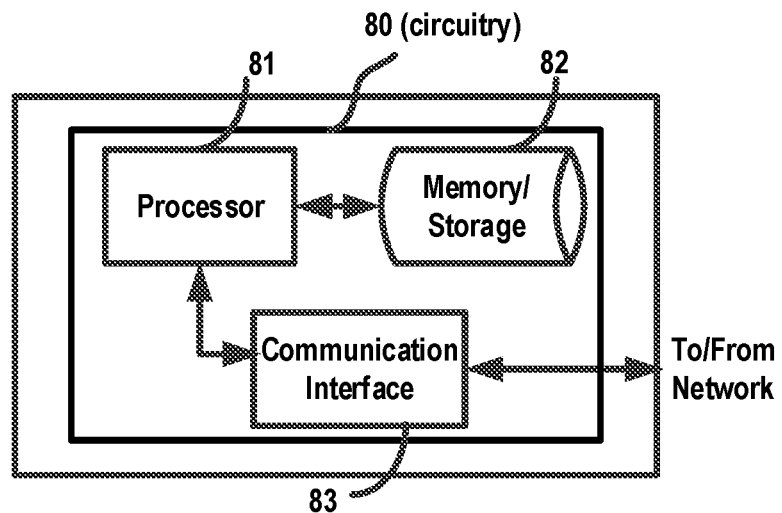
FIG. 8 illustrates a schematic illustration of a gateway in a network, according to an embodiment.

In one embodiment illustrated in FIG. 8, a UE 100 comprises a circuitry 80 which executes the method steps according to the embodiments as described in FIG. 4, along with steps 110, 112, 113, 121, 124 and 125 of FIG. 2 and FIG. 3 in addition to other embodiments described herein. In one embodiment, the circuitry 80 may comprise a processor 81 and a storage 82 (also referred to as memory) containing instructions, which when executed, cause the processor 80 to perform the steps in a method according to embodiments described herein. The circuitry 80 may further comprise a communication interface 83 to communicate with the MME 101 over the NAS interface through the access network (not shown) and to communicate with other network entity to receive data traffic when downloading the application.

Figure 9:
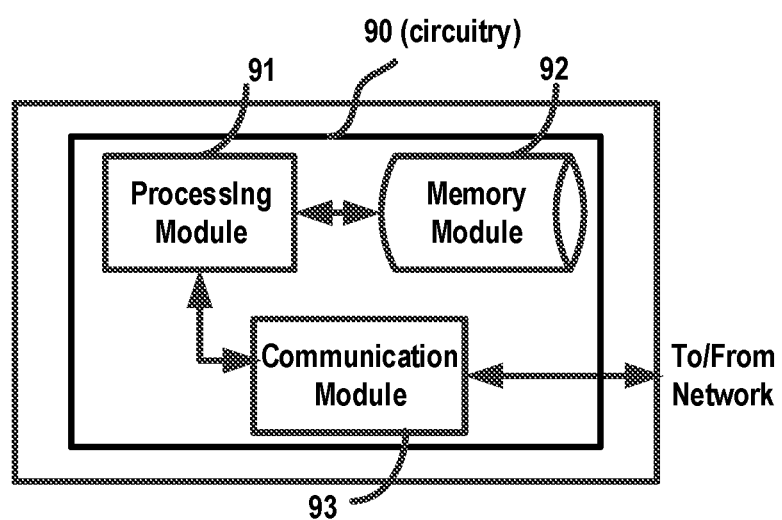
FIG. 9 illustrates a schematic illustration of a UE, according to an embodiment.

FIG. 9 illustrates an embodiment of a UE 100 comprising a processing module 91 configured to determine a downloadable size of a selected application for download from an application distribution server and send over the communication module 93 a request to the telecommunication network to reserve charging units and resources in accordance with the downloadable size, where the request comprises the downloadable size of the selected application and an identification of the application distribution server. As the processing module 91 receive an indication from the telecommunication network over the communication module 93 indicating that charging units are reserved in accordance with the downloadable size of the selected application, the UE 100 through the processing module initiates the download over the communication module 93 the selected application from the application distribution server.

The UE 100 further comprises a communication module configured to send a request to reserve the charging unit and receive a message indicating that the charging units are reserved and download the selected application if the message indicates successful reservation. The UE 100 comprises a storage module configured to maintain information comprising the downloadable size A person skilled in the art would understand that the modules in the UE 100 can be implemented as a computer program running on a processor and that the modules are operative to execute the steps of the previously described embodiments.

Figure 10:
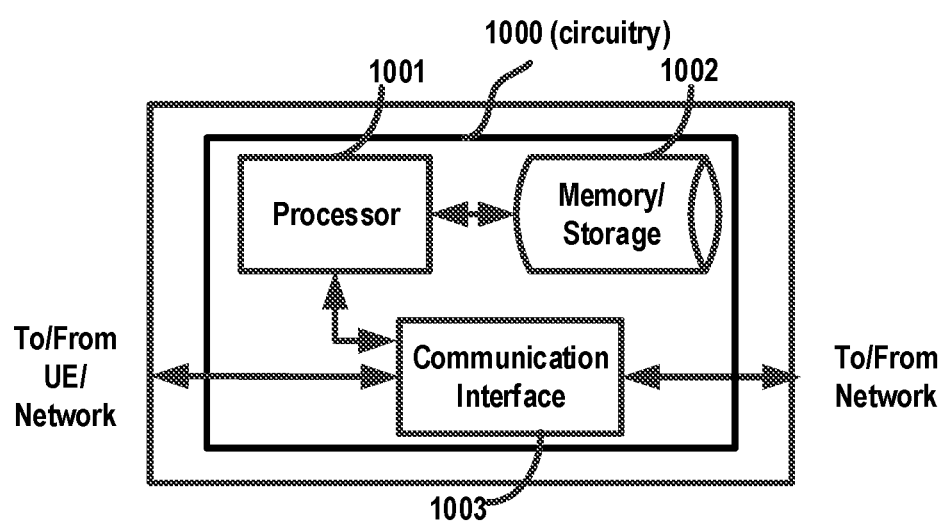
FIG. 10 illustrates a schematic illustration of a UE, according to another embodiment.

In one embodiment illustrated in FIG. 10, a packet gateway (PGW 102) comprises a circuitry 1000 which executes the method steps according to the embodiments as described in FIG. 5, along with steps 115, 116, 118, 119, 122, 123, 124, 127 and 128 of FIG. 2 and steps 115b, 119b, 122, 123, 124, 127 and 128b of FIG. 3 in addition to other embodiments described herein. In one embodiment, the circuitry 1000 may comprise a processor 1001 and a storage 1002 (also referred to as memory) containing instructions, which when executed, cause the processor 1001 to perform the steps in a method according to embodiments described herein. The circuitry 1000 may further comprise a communication interface 1003 to communicate a number of network entities over both control plane and user plane. Over the control plane, the PGW 102 communicates with the MME 101 using network interface such as GTP/proxy Mobile IP, with a policy server (PCRF 103) over a network interface such as 3GPP specified Gx interface and optionally communicates with an OCS 104 over a network interface such as the 3GPP Gy interface. Over the user plane, the PGW 102 communicates with the UE 100 using an interface such as GTP-U/IP and communicates with the PDN (intranet, extranet and internet) where ADS 105 is located using network interfaces such as IP.

Those skilled in the art will recognize improvements and modifications to the embodiments of the present disclosure. All such improvements and modifications are considered within the scope of the concepts disclosed herein and the claims that follow.

What is claimed is:

1. A method (40) of reserving charging units by a user for an application download, the method executed at a user equipment connected to a telecommunication network, the method comprising:

determining (41) a downloadable size of a selected application for download from an application distribution server;

sending (42) a request to the telecommunication network for reserving charging units and resources in accordance with the downloadable size, the request comprising the downloadable size of the selected application and an identification of the application distribution server; and responsive to an indication from the telecommunication network that charging units are reserved in accordance with the downloadable size of the selected application, downloading (43) the selected application from the application distribution server.

2. The method (40) of claim 1, wherein the request further comprises a rating of the selected application.

3. The method (40) of claim 1 further comprising establishing a dedicated resource for downloading the selected application.

4. The method (40) of claim 1 further comprising indicating to the telecommunication network successful download of the selected application.

5. The method (40) of claim 1 further comprising indicating (44) to the telecommunication network failed download of the selected application.

6. A user equipment (100) configured to reserve charging units for an application download, the user equipment (100) is connected to a telecommunication network and comprises a circuitry configured to:

determine a downloadable size of a selected application for download from an application distribution server (105);

send a request to the telecommunication network to reserve charging units and resources in accordance with the downloadable size, the request comprising the downloadable size of the selected application and an identification of the application distribution server (105); and responsive to an indication from the telecommunication network that charging units are reserved in accordance with the downloadable size of the selected application, download the selected application from the application distribution server (105).

7. The user equipment (100) of claim 6, wherein the circuitry comprises a processor, a communication interface and a memory, the memory containing instructions executable by the processor.

* * * * *